United States Patent
Rosier

(10) Patent No.: US 10,398,137 B2
(45) Date of Patent: Sep. 3, 2019

(54) CHUMMING DEVICE

(71) Applicant: Joseph Patrick Rosier, Tampa, FL (US)

(72) Inventor: Joseph Patrick Rosier, Tampa, FL (US)

( * ) Notice: Subject to any disclaimer, the term of this patent is extended or adjusted under 35 U.S.C. 154(b) by 0 days.

(21) Appl. No.: 15/947,836

(22) Filed: Apr. 8, 2018

(65) Prior Publication Data

US 2018/0368381 A1  Dec. 27, 2018

Related U.S. Application Data

(63) Continuation-in-part of application No. 15/784,096, filed on Oct. 14, 2017, now Pat. No. 10,244,745.

(60) Provisional application No. 62/524,057, filed on Jun. 23, 2017.

(51) Int. Cl.
*A01K 97/02* (2006.01)

(52) U.S. Cl.
CPC .................................. *A01K 97/02* (2013.01)

(58) Field of Classification Search
CPC ........ A01K 97/02; A63B 9/20; A63B 65/122; A63B 65/12
USPC .............. 43/4; 473/505, 507, 510, 512, 513; 124/5
See application file for complete search history.

(56) References Cited

U.S. PATENT DOCUMENTS

| | | | | |
|---|---|---|---|---|
| 3,169,019 A | * | 2/1965 | Genjack | A63B 60/08 473/457 |
| 4,060,923 A | * | 12/1977 | Schmitz | A01K 77/00 43/4 |
| D387,514 S | * | 12/1997 | Savicki | 294/1.3 |
| 2007/0199236 A1 | * | 8/2007 | Brzozowski | A01K 77/00 43/44.99 |
| 2012/0048251 A1 | * | 3/2012 | Oblack | A01K 15/025 124/5 |
| 2017/0258047 A1 | * | 9/2017 | Wills | A01K 15/027 |

FOREIGN PATENT DOCUMENTS

| | | | | |
|---|---|---|---|---|
| FR | 2843451 A1 | * | 2/2004 | ............ A01K 97/02 |
| JP | 7039424 Y2 | * | 9/1995 | |
| JP | 2533787 Y2 | * | 4/1997 | |
| JP | 09294517 A | * | 11/1997 | |

* cited by examiner

*Primary Examiner* — Magdalena Topolski
(74) *Attorney, Agent, or Firm* — Tiffany C. Miller; Inventions International Inc.

(57) ABSTRACT

A chumming device for live bait has a shaft with a primary end located opposite a secondary end. A head is connected to the primary end of the shaft. The head has a plurality of openings that facilitate water flow while scooping bait from a live well. The head has a lower portion forming a chamber configured to retain the bait. The primary side wall and the secondary side wall of the chamber have a first pair of opposing openings that are oriented in alignment with each other and are configured to receive a knife blade when the blade is received by the first pair of opposing openings. A cutting board is located between the first pair of opposing openings. The first pair of opposing openings position the knife blade over the cutting board when the knife blade is received by the first pair of opposing openings.

19 Claims, 11 Drawing Sheets

CHUMMING DEVICE

CROSS REFERENCE TO RELATED APPLICATIONS

This application is a continuation-in-part of co-pending U.S. patent application Ser. No. 15/784,096 filed Oct. 14, 2017, entitled, "Chumming Device" which claims priority to U.S. Provisional Patent Application No. 62/524/057, filed Jun. 23, 2017, entitled, "Chumming Device".

BACKGROUND OF THE INVENTION

1. Field of the Invention

This invention relates, generally, to a device used for fishing. More particularly, it relates to a device for cutting and distributing chum while, or before fishing.

2. Background Art

Currently, a variety of devices exist to release chum into water to attract fish. It is well known that chum includes chopped fish or fish fluids for angling fish. These chumming devices include, but are not limited to, bait transfer scoops, mesh pots, net bags, mesh bags, chum launchers, PVC dispensers, fishing bait catapults, baskets, and bait ball launchers. These devices are configured to dispense dead fish pieces, chum, or a luring substance and are not designed to efficiently dispense live bait. Thus, there is a need for a launching device having an improved handle portion and an improved bait retaining portion capable of capturing, retaining, and launching live bait at a length great enough to attract any type of sea life including, but not limited to, a fish or a shark, and being capable of draining excess liquid from the bait retaining portion.

In today's chumming practice, bait is often chopped at a bait table, scooped into a bait launcher, and then dispensed into the water. The bait is commonly chopped on a cutting surface such as a cutting board, a bait board, a cutting table, or a bait table. Once chopped, the chum is transferred into the dispensing device such as a bait launcher or scoop. The problem with this current process of chum preparation is that it requires an area of space capable of accommodating a bait table as well as the actual bait table. Often times, bait preparation is done on a boat and there is no space for a bait table for the chopping of bait. In another example, bait may need to be prepared at a remote location such as off of a pier or on a dock, where there may be no bait table readily available.

Currently, fishermen will bring pre-prepared or pre-cut bait. Although this may appear to solve the issue of lack of space and equipment for on-site bait preparation, it does not solve the problem for the preparation of live bait. It would be more desirable to cut live bait on-site, at the time of use because the live bait would be fresher. In particular, bait caught on the fishing ground tends to be the baitfish the prey is chasing, and this makes the bait more attractive than imported bait. Further, freshly killed bait still retains the oils, blood, and other attractions to the prey. Thus, there is a need for live bait to be scooped into an improved chum device having slots capable of receiving a blade of a knife and having an inner cutting surface capable withstanding cuts from the blade of a knife. As a result, this improved chum device would eliminate the need for additional equipment such as a bait cutting table, eliminate the need to store this equipment when not in use, eliminate the need to set-up this equipment during use, and eliminate the area required to use the equipment.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a chumming device for live bait having a shaft with a primary end located opposite a secondary end. A head is connected to the primary end of the shaft. The head has a plurality of openings that facilitate water flow while scooping bait from a live well. The head has a lower portion forming a chamber configured to retain the bait. The chamber has a primary side wall located opposite a secondary side wall. The primary side wall and the secondary side wall have a first pair of opposing openings that are oriented in alignment with each other and are configured to receive a blade of a knife when the blade of a knife is received by the first pair of opposing openings. A cutting board is located between the first pair of opposing openings. The first pair of opposing openings are configured to position the blade of the knife over the cutting board when the blade of the knife is received by the first pair of opposing openings.

The chamber has a lip located opposite a protruding structure. The protruding structure extends beyond the chamber opening and is configured to align the bait to be launched in a direction by the force of a user. A handle is connected to the secondary end of the shaft. The shaft can have a plurality of bores each have different sized diameters arranged in an ascending diameter. The shaft can have a plurality of shaft openings. The novel chumming device is configured to gather live bait from a live well on a boat or on land and to distribute the live bait in a chumming manner while fishing and is now met by a new, useful, and non-obvious invention.

The following description and drawings are illustrative and are not to be construed as limiting. Numerous specific details are described to provide a thorough understanding. However, in certain instances, well know or conventional details are not described in order to avoid obscuring the description. References to one or an embodiment in the present disclosure are not necessarily references to the same embodiment; and, such references refer to at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

In a preferred embodiment, the novel chumming device is designed to gather live bait from a live well on a boat or on land and to distribute the live bait in a chumming manner while fishing. The chumming device for bait has a head connected to a primary end of a shaft. The head has a plurality of openings, whereby, the head is completely perforated. The plurality of openings of the head is configured to allow water flow while scooping bait from a live well. The head has a top portion being angled, whereby, the top portion of the head is configured to launch bait from the head. The head has a lower portion being a reservoir. The lower portion of the head is configured to retain bait. The lower portion of the head has a lip. The lip extends up from the primary end of the shaft. The chumming device has a shaft having a primary end located opposite a secondary end. The shaft has a slight forward curvature, whereby, the slight forward curvature is configured to launch bait from the lower portion of the head. The chumming device has a handle connected to the secondary end of the shaft. The handle is configured to be gripped by a user.

The novel chumming device can have a handle having a length that is straight in orientation. Although it is a preferred embodiment for the handle to be curved, it is within the scope of this invention for the handle to not have a curve or an angle. The handle can have a diameter configured to be received by a rod holder.

The novel chumming device can have a shaft being made of a flexible material. The flexibility of the shaft is an important feature of this present invention for increasing the launch distance of the bait from the head. However, the material of the shaft cannot be too flexible because the shaft needs to be firm enough for a user to scoop bait from a well without the shaft snapping.

The novel chumming device can have a handle having at least one finger groove or recess located on an outer surface of the handle. The shaft can have a plurality of recesses configured to receive at least a portion of a user's hand when a user is grasping the handle portion of the shaft.

In an alternate embodiment, the novel chumming device has a shaft having a primary end located opposite a secondary end. At least a portion of the shaft has a curvature. A head is connected to the primary end of the shaft. The head has a plurality of openings that are configured to allow water flow while scooping bait from a live well. The head has a top portion configured to launch bait from the head. The head has a lower portion forming a chamber configured to retain bait. The chamber has a primary side wall located opposite a secondary side wall. The primary side wall and the secondary side wall each have a plurality of openings located thereon. The primary side wall has a recess bordering the chamber opening and the secondary side wall has a recess bordering the chamber opening. The chamber has a lip located opposite a protruding structure. The lip and the protruding structure each have a plurality of openings located thereon. The protruding structure extends beyond the chamber opening. The chamber opening has a size great enough to receive bait within the chamber. The bait pass through the chamber opening of the chamber and are retained within the chamber of the head until the bait are launched out of the chamber by the force of a user swinging the chumming device. The protruding structure is configured to align the bait to be launched in a direction by the force of a user. A handle is connected to the secondary end of the shaft.

The novel chumming device has plurality of openings located on the head. It is a preferred embodiment that these openings are rows of vertically oriented slots. Each vertically oriented slot is positioned parallel to a subsequent vertically oriented slot. These rows of slots can be oriented in columns located on the surface of the head of the chumming device.

The novel chumming device can have a handle having at least one finger groove.

The novel chumming device can alternatively have a primary end of the shaft having a plurality of sequentially arranged bores, whereby, said plurality of bores each have different sized diameters. The plurality of bores are arranged in an ascending or descending diameter size. For example, the bore located nearest the handle portion has a diameter that is smaller in size than the subsequent bore nearest to the head of the chumming device. The bore located closest to the head of the chumming device will have a diameter that is larger in size that the bores closest to the handle of the shaft.

The novel chumming device can have a shaft having a primary shaft opening, a secondary shaft opening, and a tertiary shaft opening traversing the length of the shaft. At least a portion of the primary shaft opening overlays a portion of the secondary shaft opening. At least a portion of the tertiary shaft opening overlays a portion of the secondary shaft opening. For example, the definition of overlay refers to the shaft openings orientation, whereby, at least a portion of the shaft openings are located next to each other or parallel to each other. At least a portion of both the primary shaft opening and the tertiary shaft opening are positioned in a parallel orientation to the secondary shaft opening within the shaft. It is within the scope of this invention for the shaft openings to extend through or traverse at least a portion of the length of the handle of the shaft as well as the traverse the length of the shaft.

The handle is integrally formed within the shaft. The handle may have grooves or finger recesses located on the outer surface of the handle. These outer surface grooves may mirror the shape of the shaft openings located throughout the shaft. For example, the secondary shaft opening has a recess positioned parallel to a primary finger recess of the handle. The tertiary shaft opening can have a shape substantially contouring a secondary finger recess of the handle. The shaft openings make the chumming device light in weight, allow for flexibility of the shaft, and eliminate the use of excess material used to form the shaft. Additionally, the configuration of the shaft openings being staggered and traversing the length of the shaft provide the strength needed for the shaft to support the weight of the chamber retaining bait and to withstand the force of a user swinging the novel chumming device to launch the bait from the chamber. The secondary end of the shaft can have an anchoring recess configured to interlock with a rod holder.

It is within the scope of this current invention for the novel chumming device to be fabricated from one piece of material made from any solid, yet slightly flexible material, including but not limited to, plastic, polymer, PVC, or any synthetic material.

In an alternate embodiment, the novel chumming device can have a chamber having a cutting board, a cutting surface, or a cutting layer. The inner bottom surface of the chamber is flat or substantially planar so that the bait fish can be chopped while being retained within the chamber of the novel bait scoop. The first pair of opposing openings have the same size lengths and when they both receive the blade of a knife, the blade is positioned over the cutting board. When the knife is positioned toward the lower portion of the chamber towards the cutting board, the live bait being retained in the chamber are cut by the knife. The cutting board can be made of any material including, but not limited to, wood, plastic, glass, steel, marble, nylon, polyurethane, or high density polyethylene. The cutting board may be a separate piece that is connected to a flat chamber lower portion. The cutting board may alternatively be integrally formed within the chamber as one piece.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
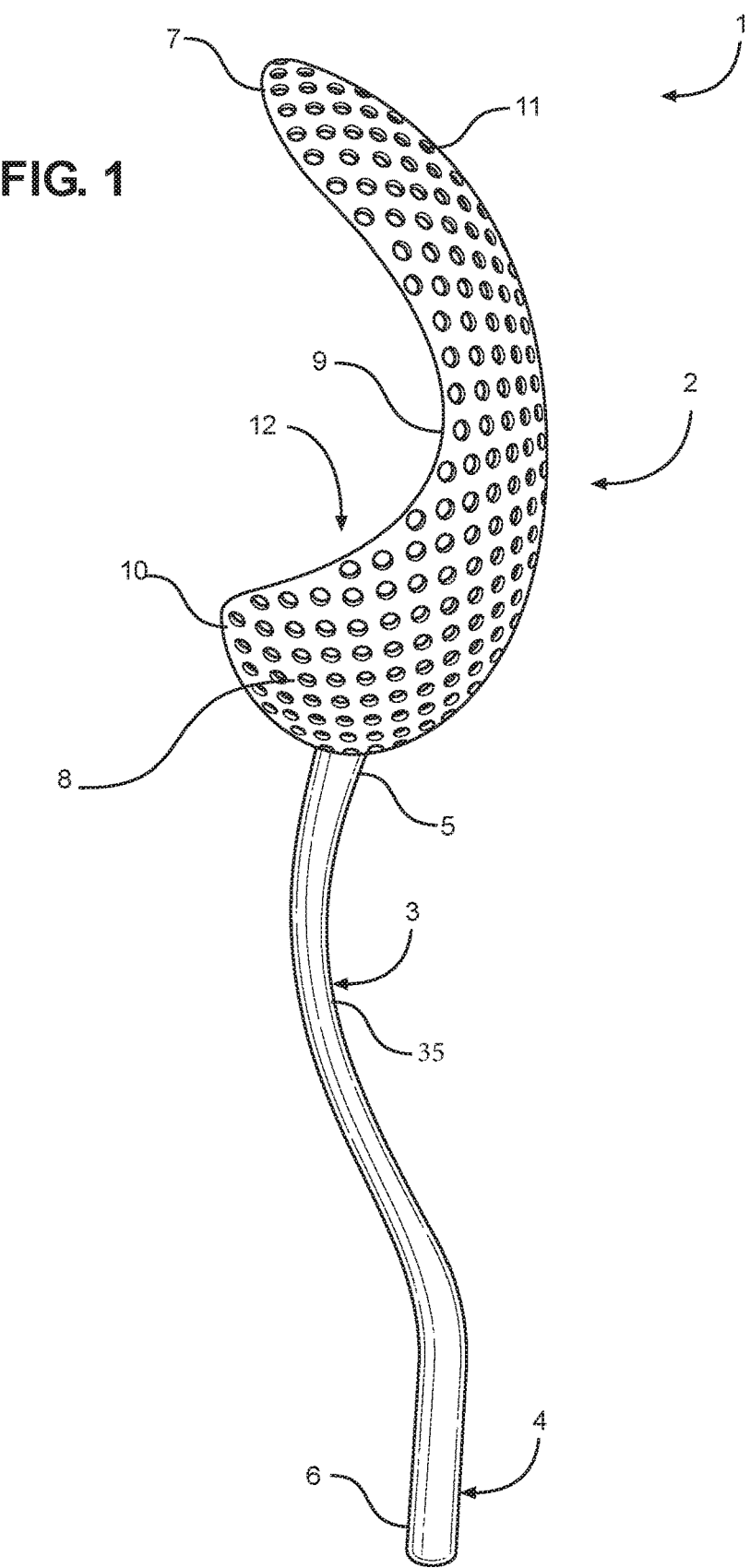
FIG. 1 is a side perspective view of the novel chumming device having a head, a curved shaft, and a handle.
Figure 2:
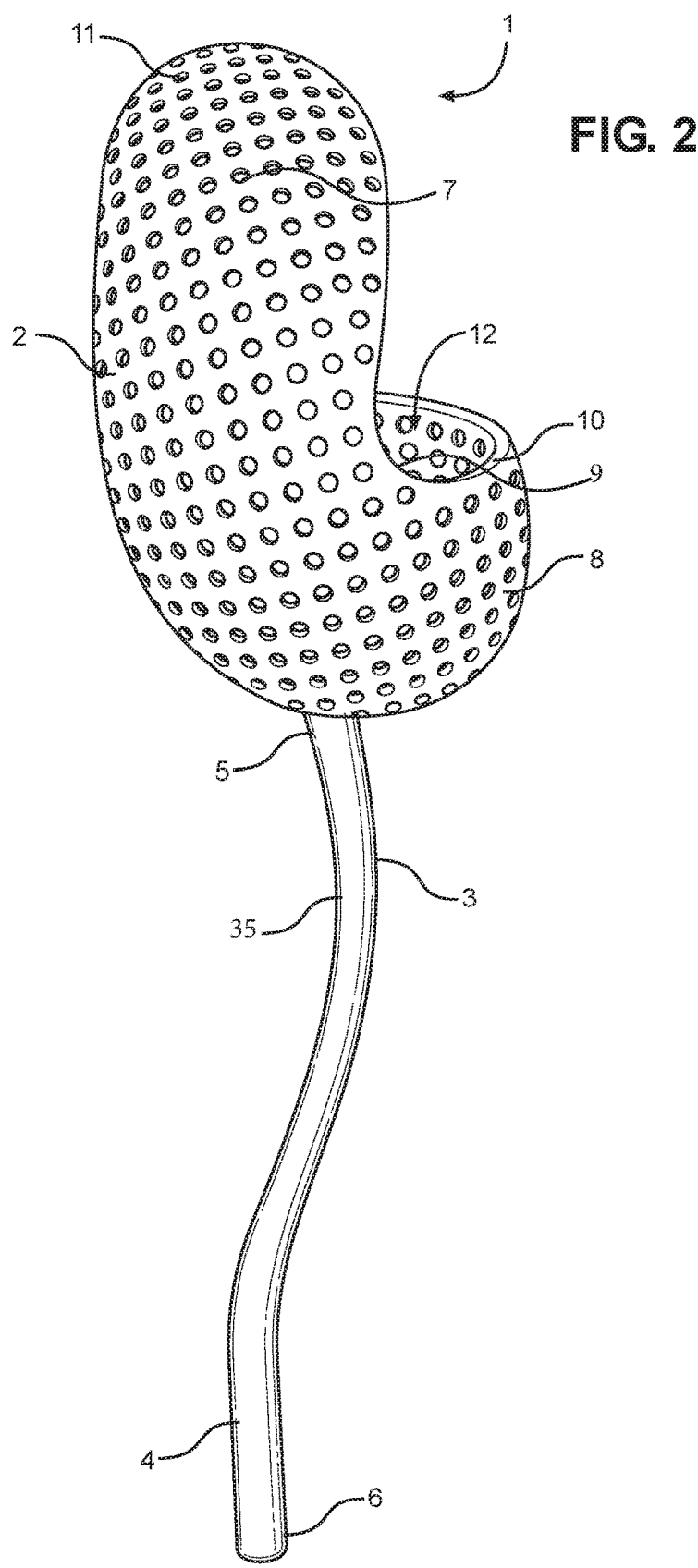
FIG. 2 is a rear perspective view of the novel chumming device having a head, a curved shaft, and a handle.

FIGS. 1 and 2 both illustrate an embodiment of chumming device 1 in accordance with present disclosure. Chumming device 1 has shaft 3 having primary end 5 located opposite secondary end 6. Head 2 is connected to primary end 5 of shaft 3. Head 2 has a top portion 7 and a lower portion 8. Handle 4 is connected to secondary end 6 of shaft 3. Shaft 3 has curvature 35. Head 2 serves as the scoop, reservoir 12, container, and the final launching piece. It is within the scope of this invention for head 2 to include, but not be limited to, a circular or oblong cup shape. In another embodiment, head 2 can be totally perforated 11 to allow water flow while scooping the bait from the live well.

In an embodiment, head 2 of chumming device 1 can be approximately 8-16" in height, approximately 5-10" in width, and approximately 3-8" deep. In another embodiment as best depicted in FIGS. 1 and 2, the depth of head 2 varies at different points. For example, the top portion 7 of head 2 can be angled 9 in a manner to assist in the launching and spreading of bait (not shown) as the bait are flung out of head 2. In yet another embodiment, the lower portion 8 of head 2 is larger in size and serves as a reservoir 12 to hold and contain the bait (not shown) before they are launched. It is within the scope of this current invention for lower portion 8 of head 2 to have lip 10. Lip 10 is configured to retain bait (not shown) in head 2 of chumming device 1 until the bait is launched. In another embodiment, lip 10 will extend approximately 4-6" up from shaft 3.

Figure 3:
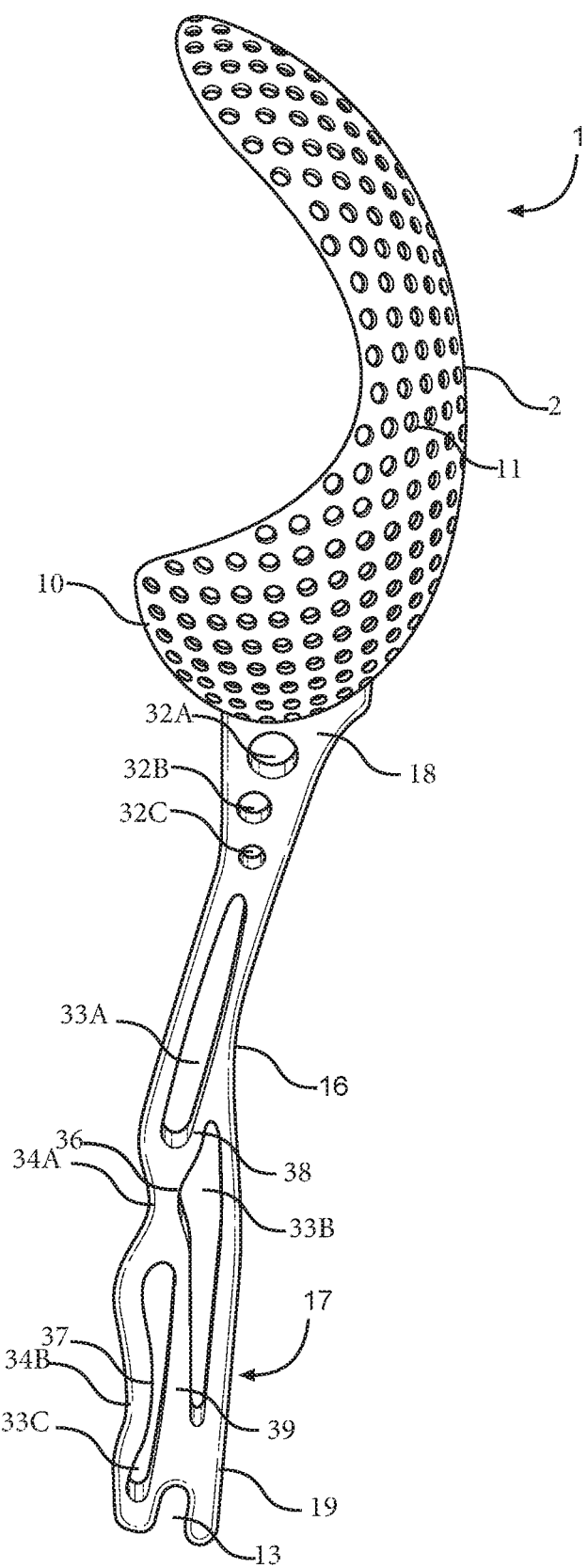
FIG. 3 is side perspective view of an alternative embodiment of the novel chumming device having a handle with finger grooves and shaft openings.

In an embodiment as best shown in FIGS. 1-3, the entire head 2, including lip 10, is perforated 11 as to allow chumming device 1 to flow easily through the water while collecting bait from the well. In an embodiment, perforations 11 are frequent enough to allow the flow of water, but also small enough as to not hinder, block, obstruct, or catch the bait as they are being flung (i.e. a very large amount of very small holes 11).

Shaft 3 of chumming device 1 serves as the lever that initiates, with arm propulsion, the launching of the bait.

In yet another embodiment, shaft 3 is one linear piece with a slight forward curvature 35 (FIGS. 1 and 2) that allows for further launching of the bait through the flexibleness of the material. However, shaft 3 is not so flexible that it hinders, or makes difficult, retrieving bait out of the live well (not shown). In the illustrated embodiments of FIGS. 1 and 2, shaft 3, depending on the model, is approximately 10-36" long.

Handle 4 (FIGS. 1 and 2) serves as the gripping point for chumming device 1 in order to retrieve bait from the live well and to launch the bait in a chumming manner. It is within the scope of this invention for handle 4 to be specially designed to aid in easier storage of the device, as described below.

In an embodiment shown in FIGS. 1 and 2, handle 4 is circular and is designed to fit into standard rod holders mounted on boats, docks, or land. These rod holders vary in size but are usually no larger than 2" in diameter. Therefore, in such embodiments, handle 4 is approximately 1½" in diameter and is approximately 6" in length. In the illustrated embodiments in FIGS. 1 and 2, handle 4 is straight (unlike shaft 3) to allow the device to be stores in a rod holder.

Figure 4:
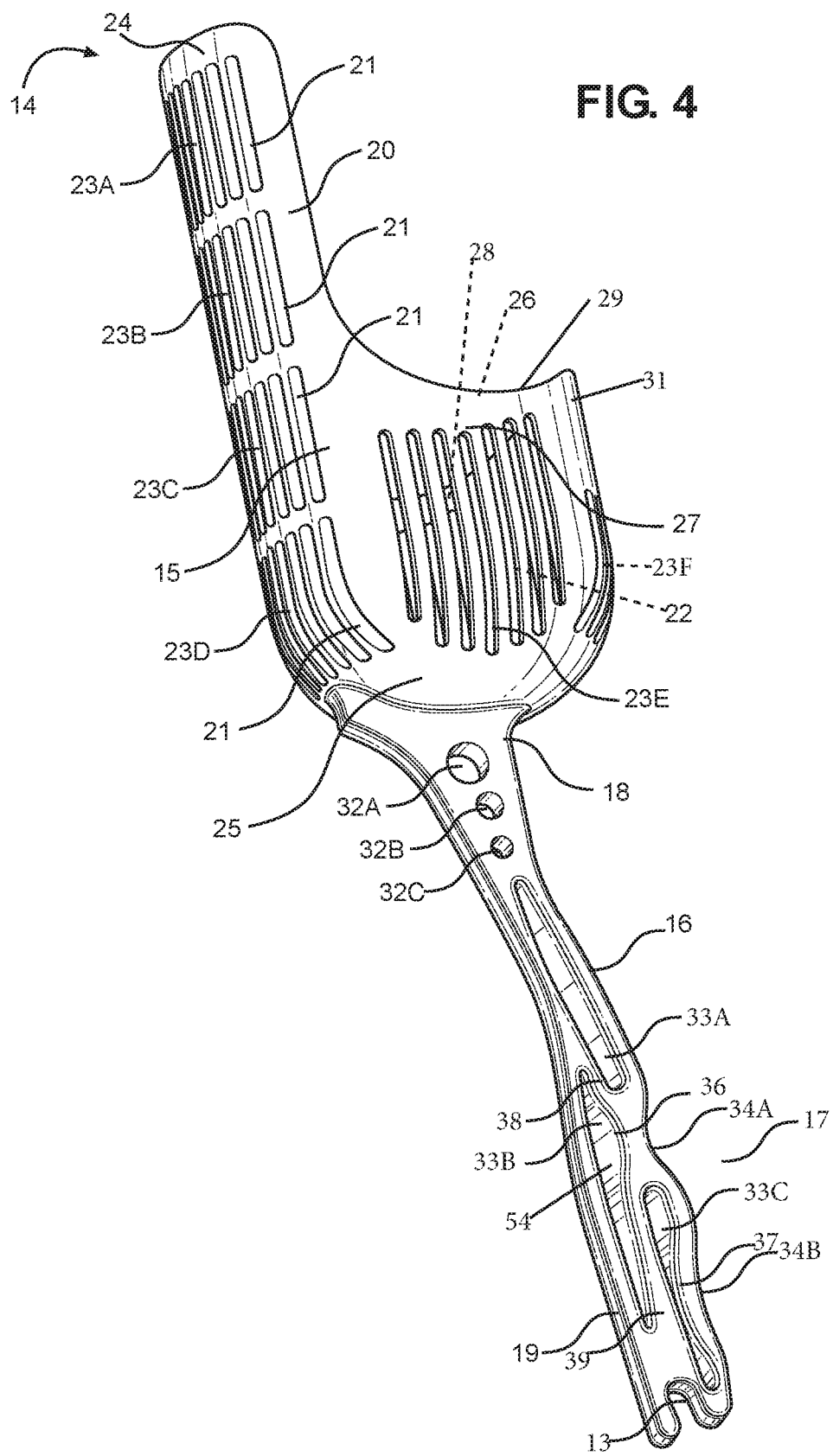
FIG. 4 is a perspective view of an alternate embodiment of the novel chumming device having a head, a shaft, and a handle with finger grooves and shaft openings.

FIG. 3 shows chumming device 1 having head 2 with an alternate embodiment of shaft 16. FIGS. 3 and 4 best illustrate shaft 16. Handle 17 of shaft 16 has slight finger and thumb grooves 13 to allow for better gripping. Shaft 16 has primary end 18 located opposite secondary end 19. Primary end 18 of shaft 16 has a plurality of bores 32A-C. It is a preferred embodiment for the plurality of bores 32A-C to be circular in shape. Opening 32A has a first diameter. Opening 32B has a second diameter. Opening 32C has a third diameter. The first diameter of opening 32A is a length greater than the diameter length of opening 32B and greater than the diameter length of opening 32C. Second diameter of opening 32B is a length greater than the diameter length of opening 32C. The differing sized bores 32A-32C of shaft 16 are positioned through primary end 18 of shaft 16 in an ascending orientation, whereby, the diameter of each bore increases in size traveling toward the head to allow flexibility of the chumming device when launching the bait from the chumming device. For example, FIGS. 3-4 illustrate diameter of bores increasing in size as the bores 32A-C traverse the length of shaft 16 toward the head of the chumming device, whereby, bore 32C is smaller in size and bore 31A is larger in size.

As best shown in FIGS. 3-4, shaft 16 has shaft openings 33A-33C. Shaft openings 33A-33C have a length greater than their width and they traverse at least a portion of the length of shaft 16. A portion of shaft opening 33A overlays 38 at least a portion of shaft opening 33B. At least a portion of shaft opening 33C overlays 39 at least a portion of shaft opening 33B. Shaft openings 33A-33C allow flexibility of shaft 16 when a user launches bait. Also, the orientation of shaft openings 33A-33C helps in the structural sturdiness of shaft 16, allowing flexibility without causing strain and breakage of shaft 16.

Figure 5:
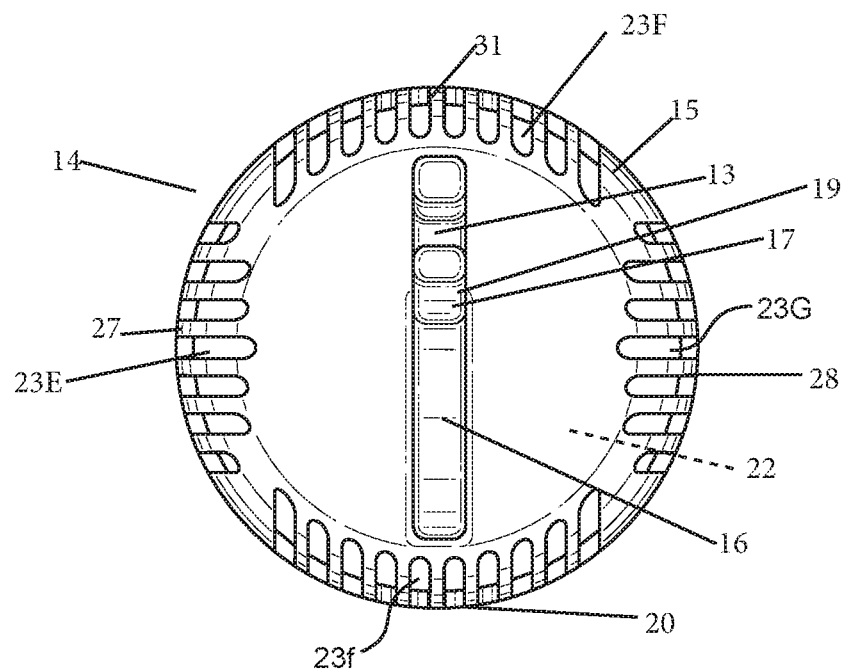
FIG. 5 is a bottom view of an alternate embodiment of the novel chumming device having a handle portion having an anchoring recess located thereon.

Many rod holders have a small circular piece located at the bottom which allows a rod to interlock with to prevent movement. Handle 17 has anchoring recess 13 (FIGS. 3-5) located on secondary end 19 of handle 17. Anchoring recess 13 of handle 17 is configured to fit into the bottom portion of a rod holder to prevent movement of the chumming device.

FIGS. 3-4 best depict handle 17 having finger recesses 34A and 34B. Finger recesses 34A and 34B are located on the outer surface of handle 17. Finger recesses 34A and 34B may mirror or be oriented in a location opposing the shape of any of the shaft openings 33A-C located throughout shaft 16. Secondary shaft opening 33B has a recess 36 in a position opposing primary finger recess 34A of handle 17. Tertiary shaft opening 33C can has a recess 37 substantially contouring secondary finger recess 34B of handle 17.

Figure 7:
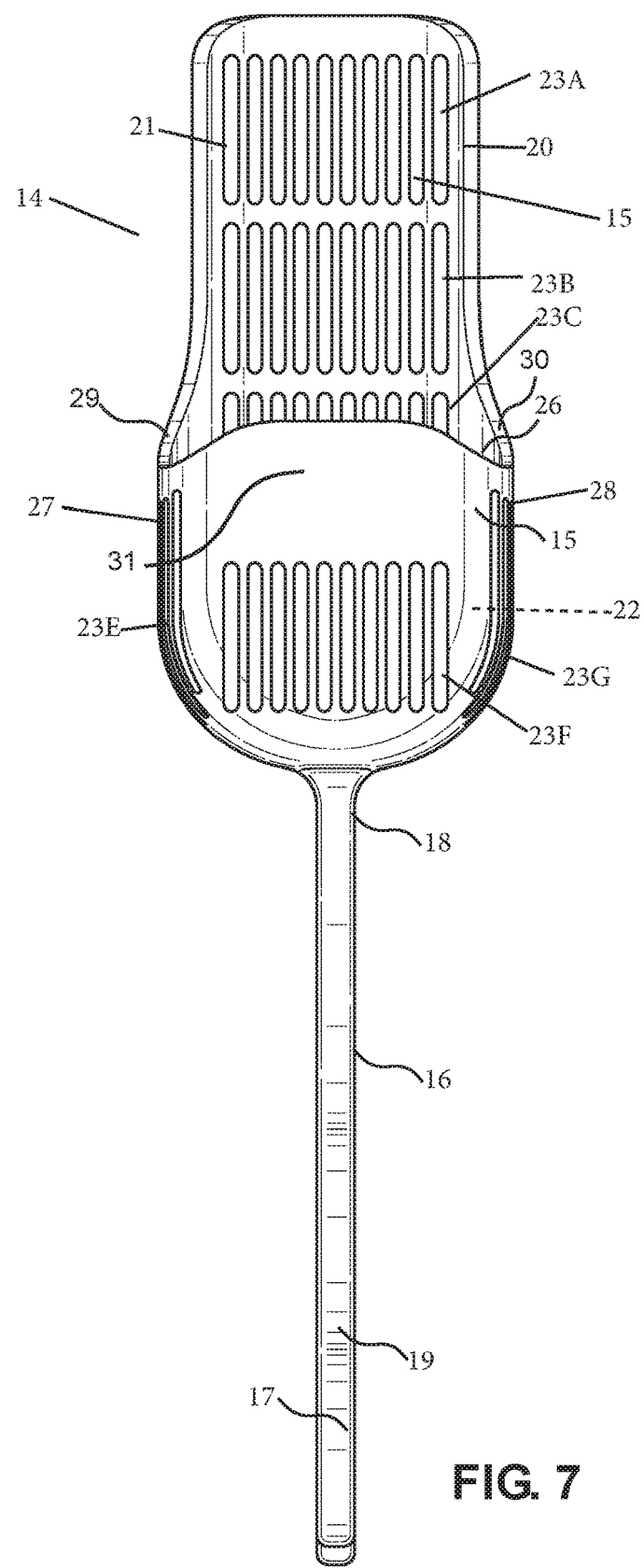
FIG. 7 is a front perspective view of an alternate embodiment of the novel chumming device having a head with a protruding structure and a lip.
Figure 8:
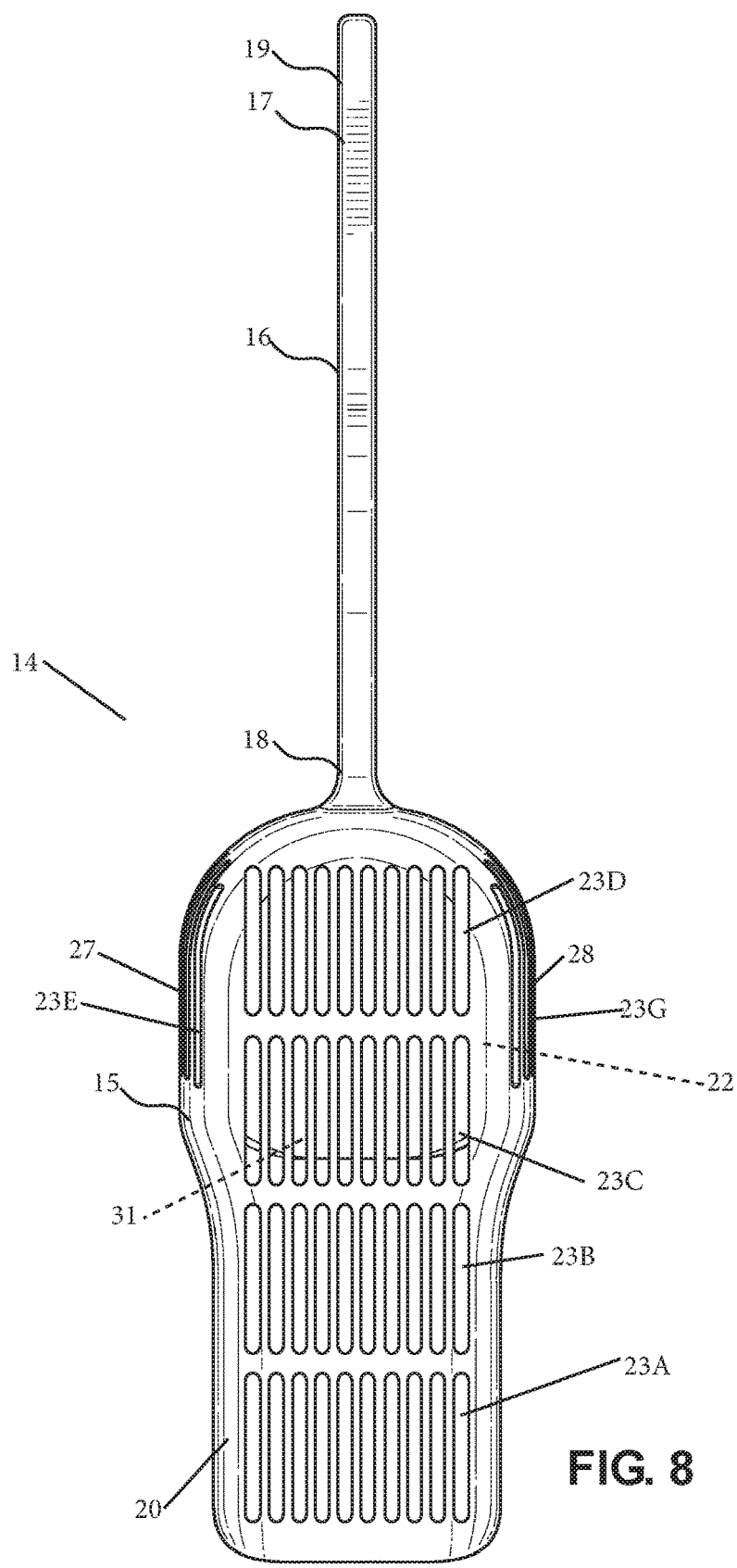
FIG. 8 is a rear view of an alternate embodiment of the novel chumming device having a head having a protruding structure with a plurality of vertically oriented slots.

FIGS. 4, 7, and 8 illustrate an alternate embodiment of chumming device 14 having shaft 16 having primary end 18 located opposite secondary end 19. Head 15 is connected to primary end 18 of shaft 16. Head 15 is configured to scoop bait from live bait well.

Figure 6:
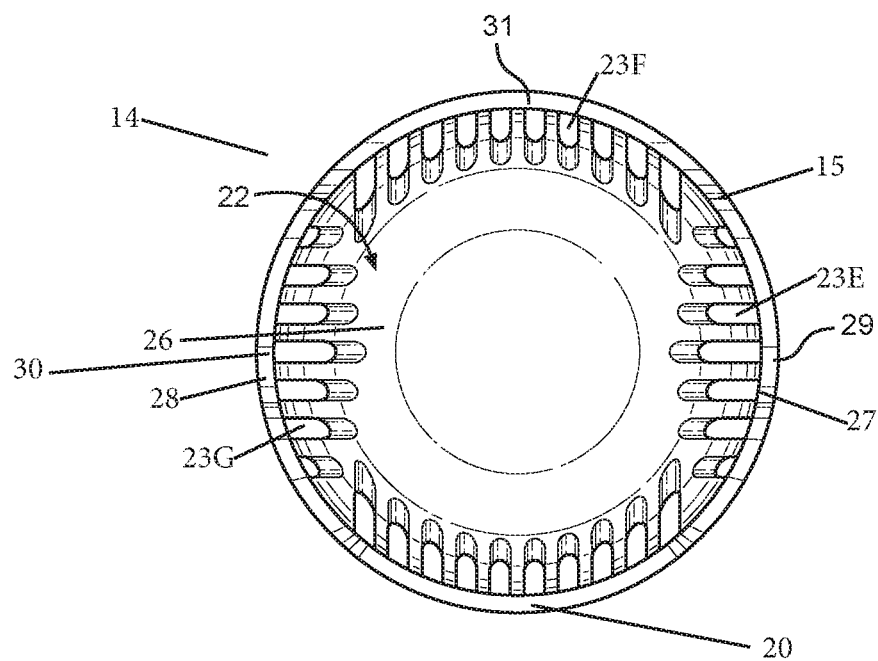
FIG. 6 is a top view of an alternate embodiment of the novel chumming device having a head having a chamber with a plurality of slotted openings.

As best shown in FIGS. 4, 6, and 7 head 15 has chamber 22 configured to retain live bait. Water can flow out of chamber 22 through a plurality of vertically oriented slots 23A-G. Chamber 22 has chamber opening 26 configured to receive including, but not limited to, bait, live bait, or chum. The bait is retained within chamber 22 until the bait is launched from chamber 22 by the force of a user.

FIGS. 4-8 illustrate chamber 22 of head 15 having primary side wall 27 located opposite secondary side wall 28. FIGS. 4 and 6 illustrate primary side wall 27 having recess 29. FIGS. 4-8 show primary side wall 27 having row 23E of plurality of vertically oriented slots 21. FIG. 6 best shows secondary side wall 28 having recess 30 and row 23G of plurality of vertically oriented slots 21. FIGS. 5-8 show secondary side wall 28 having row 23G of plurality of vertically oriented slots 21. Chamber 22 of head 15 has lip 31 located opposite protruding structure 20. FIGS. 4, 5, 6, and 7 show lip 31 having row 23F of plurality of vertically oriented slots 21.

FIGS. 4-8 further illustrate an alternate embodiment of chumming device 14 having head 15 with protruding structure 20. Head 15 and protruding structure 20 have a plurality of vertically oriented slots 21 positioned parallel to each other. It is within the scope of this invention for a vertically oriented slot 21 to be defined as an opening having a height greater than its width. There are rows 23A-G of a plurality of vertically oriented slots 21. Row 23A and row 23B are located at the top portion 24 (FIG. 4) of protruding structure 20. Row 23C and row 23D are located at lower portion 25 (FIG. 4) of head 15. FIG. 4 illustrates long shaft opening 33B having inner wall surface 54.

FIGS. 4-5 and 7-8 depict an alternate embodiment of chumming device 14 having handle 17 being connected to secondary end 19 of shaft 16.

Figure 13:
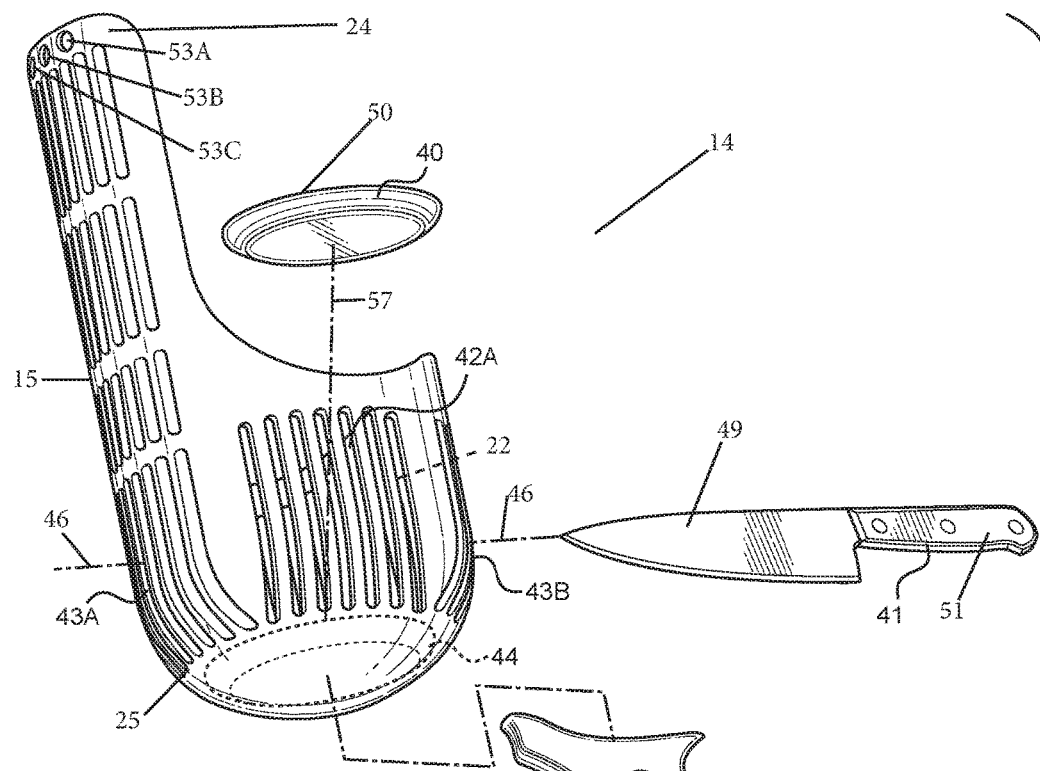
FIG. 13 is an exploded perspective view of an alternate embodiment of the novel chumming device having a cutting board connected to an inner surface of the chamber and having a second pair of opposing openings configured to receive the blade of a knife.

The embodiment of chumming device 14 of FIGS. 4-8 can have cutting board 40 as illustrated in FIGS. 9-16. Cutting board 40 has a flat, planar surface 50. Chumming device 14 has shaft 16 having a first end 18 located opposite second end 19. Shaft 16 has curvature 35 (FIG. 13). Head 15 is connected to first end 18 of shaft 16. Head 15 has plurality of openings 21 configured to allow water to flow while scooping live bait from a live well. Head 15 has top portion 24 configured to launch bait from head 15. Head 15 has lower portion 25 forming chamber 22. Chamber 22 has chamber opening 26. Chamber opening has a size great enough to receive live bait such as fish. Chamber 22 retains bait. Lower portion 25 of chamber 22 has cutting board 40.

The embodiment of chumming device 14 of FIGS. 4-8 can have chamber 22 having first side wall 27 located opposite second side wall 28. First side wall 27 and second side wall 28 have first pair of opposing openings 42A and 42B as illustrated in FIGS. 9-16. It is within the scope of this invention for first pair of opposing openings 42A and 42B to be slots having each having the same size and each having a size capable of receiving blade 49 of knife 41. As best shown in FIGS. 9, 14-16, first pair of opposing openings 42A and 42B are oriented in alignment 45 (FIGS. 14-16) with each other and are configured to receive blade 49 of knife 41 when blade 49 of knife 41 is received by first pair of opposing openings 42A and 42B. Cutting board 40 is located between first pair of opposing openings 42A and 42B. First pair of opposing openings 42A and 42B are configured to position blade 49 of knife 41 over 52 cutting board 40, through bait (not shown), and in contact with cutting board 40 when blade 49 of knife 41 is received by both first pair of opposing openings 42A and 42B.

Chamber 22 has lip 31 located opposite protruding structure 20. Protruding structure 20 extends beyond chamber 22. Protruding structure 20 is configured to align the bait to be launched in a direction by a force of a user. Handle 17 is connected to second end 19 of shaft 16.

FIGS. 9-16 illustrate cutting board 40 being positioned between both first pair of opposing openings 42A and 42B of chamber 22 of bottom portion 25 of head 15. Cutting board 40 can also be positioned next to both second pair of opposing openings 43A and 43B. It is within the scope of this invention for cutting board 40 to abut both first pair of opposing openings 42A and 42B and second pair of opposing openings 43A and 43B. Cutting board 40 is configured to make contact with knife blade 49 when knife blade 49 is inserted through a pair of opposing openings and when knife blade 49 is forced toward cutting board 40.

The embodiment of chumming device 14 of FIGS. 4-8 can have head 15 having chamber 22 with second pair of opposing openings 43A (FIGS. 12) and 43B as illustrated in FIGS. 11-16. Second pair of opposing openings 43A and 43B are oriented in alignment 46 (FIGS. 13-16) with each other and are configured to receive blade 49 of knife 41 when blade 49 of knife 41 is received by second pair of opposing openings 43A and 43B. Cutting board 40 is located between second pair of opposing openings 43A and 43B. Second pair of opposing openings 43A and 43B are configured to position blade 49 of knife 41 over 52 (FIGS. 9-12) cutting board 40, through bait (not shown), and in contact with cutting board 40 when blade 49 of knife 41 is received by both second pair of opposing openings 43A and 43B.

Figures 9, 10:
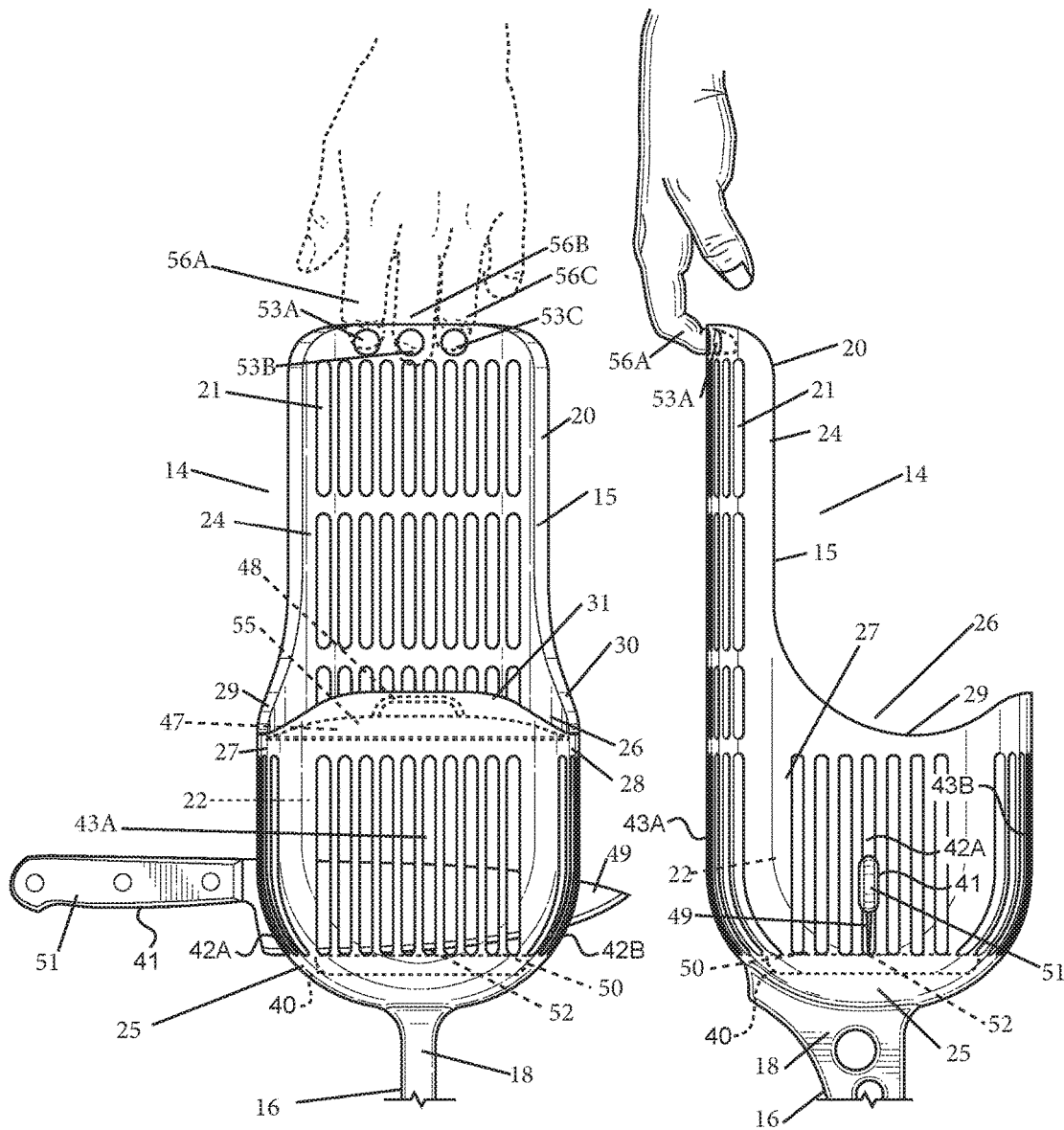
FIG. 9 is a front perspective view of an alternate embodiment of the novel chumming device having a cutting board connected to an inner surface of the chamber and having a first pair of opposing openings orienting the blade of a knife over the cutting board.
FIG. 10 is a side perspective view of an alternate embodiment of the novel chumming device having a cutting board connected to an inner surface of the chamber and having a first pair of opposing openings orienting the blade of a knife over the cutting board.

The embodiment of chumming device 14 of FIGS. 4-8 as shown in FIGS. 9-10, illustrate chumming device 14 having knife 41 with blade 49 portion and handle 51. Cutting board 40 is connected to bottom portion 25 of head 15. Cutting board 40 has a flat, planar surface 50 (FIGS. 9-16). Blade 49 of knife 41 is oriented over 52 cutting board 40 when blade 49 of knife 41 is received by first pair of opposing openings 42A and 42B (FIG. 9). When the force of a user is applied to knife 41, the blade 49 of knife 41 cuts through bait retained within chamber 22. The knife 41 will stop cutting once blade 49 comes into contact with cutting board 40.

Figure 14:
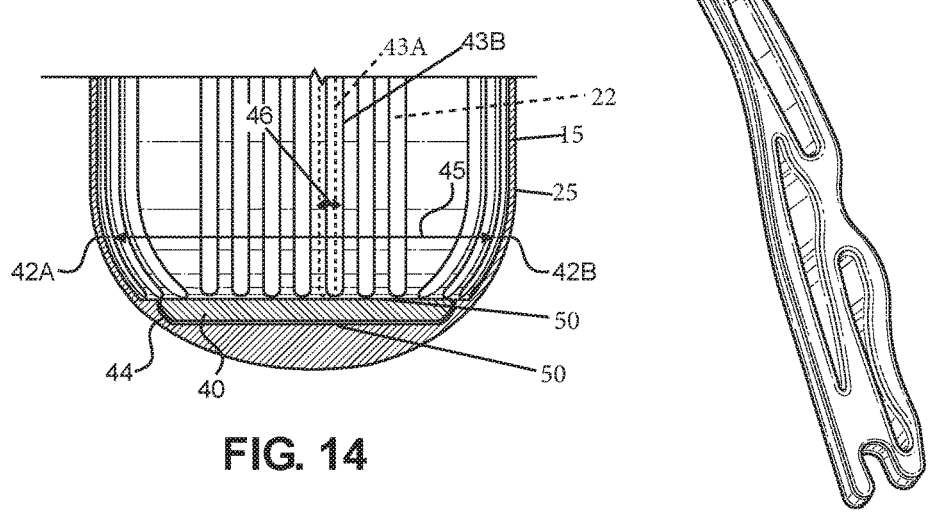
FIG. 14 is a partial side cut-away view of the head of the novel chumming device having a chamber recess retaining at least a portion of a cutting board, at least a portion of the cutting board is positioned between both of the first pair of opposing openings and the second pair of opposing openings.
Figure 15:
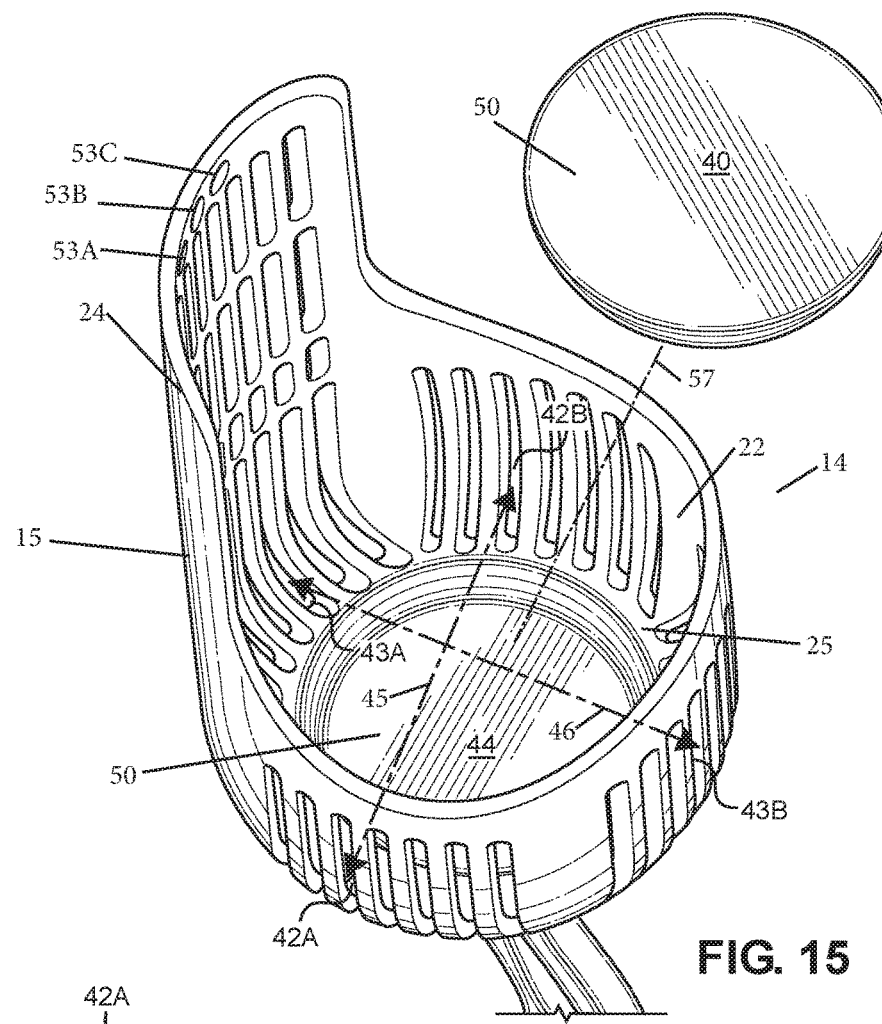
FIG. 15 is a top perspective view of the chamber of the novel chumming device having a cutting board, having a first pair of opposing openings being in alignment with each other, and having a second pair of opposing openings being in alignment with each other.
Figure 16:
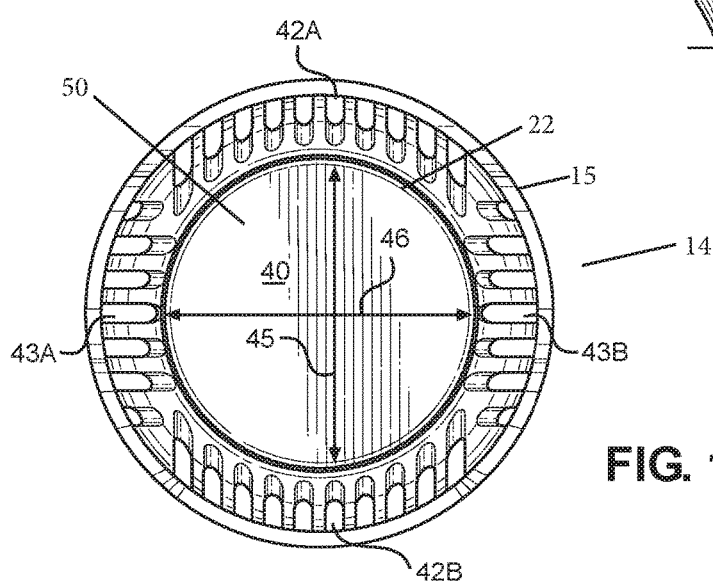
FIG. 16 is a top view of the chamber of the novel chumming device having a cutting board, having a first pair of opposing openings being in alignment with each other, and having a second pair of opposing openings being in alignment with each other.

Lower portion 25 of chamber 22 has recess 44 (FIGS. 13-15). Cutting board 40 is connected to lower portion 25 of chamber 22. FIGS. 13 and 15 shows cutting board 40 is a separate piece that is received 57 by recess 44. FIG. 14 best illustrates cutting board 40 can be retained within recess 44. Recess 44 has a substantially flat, planar surface 50. It is within the scope of this invention for at least a portion of cutting board 40 to protrude from recess 44. The cutting board 40 can be a cutting surface that is a substantially flat planar surface 50 capable of being durable enough to withstand the cutting of live bait within the chamber. Lower portion 25 of chamber 22 is planar 50. It is within the scope of this invention for cutting board 40 to be integrally formed into inner wall surface of lower portion 25 of chamber 22. FIG. 14 shows cutting board 40 is perpendicular to first pair of opposing openings 42A-42B and second pair of opposing openings 43A-43B. It is within the scope of this invention for the cutting board 40 to be connected to an inner wall surface of chamber 22 and not be retained within recess 44.

Referring now to FIGS. 9-13 and 15, chum device 14 can have at least one opening 53A-53C configured to receive at least one finger 56A-56C (FIGS. 9-12) of a user. The user can hold chum device 14 when a user's fingers of a first hand are inserted through the openings 53A-53C. Then, the user's second hand can hold handle 51 of knife 41 while positioning blade 49 of knife 41 through first pair of opposing openings 42A and 42B or second pair of opposing openings 43A and 43B. The openings 53A-53C are located at the top portion 24 of head 15. This position of openings 15A-15C positions the user's fingers away from blade 49 of knife 41 when blade 49 enters chamber 22 through first or second pair of opposing openings 42A-42B and 43A-43B respectively.

The novel chum device 14 can have plurality of openings 21 positioned in rows of vertically oriented slots 21. Vertically oriented slots 21 are positioned parallel to each other in rows 23A-23D. Handle 17 has at least one finger groove 34A-34B.

The embodiment of chumming device 14 of FIGS. 4-8 as shown in FIG. 13 have first end 18 of shaft 16 have a plurality of bores 32A-32C each having different sized diameters. The plurality of bores 32A-32C are arranged in ascending diameter size from first end 18 of shaft 16 toward head 15. First bore 32A has a first diameter length. Second bore 32B has a second diameter length. Third bore 32C has a third diameter length. First diameter length of first bore 32A is a length greater than second diameter length of second bore 32B. Second diameter length of second bore 32B is a length greater than third diameter length of third bore 32C.

Shaft 16 has first shaft opening 33A, second shaft opening 33B, and third shaft opening 33C traversing the length of shaft 16. At least a portion of first shaft opening 33A overlays a portion of second shaft opening 33B. At least a portion of third shaft opening 33C overlays a portion of second shaft opening 33B. Second shaft opening 33B has a recess 36 positioned parallel to a first finger recess of handle 17. Recess 36 is on inner wall surface of second shaft opening 33B. Third shaft opening 33C has a shape 37 substantially contouring a second finger recess 34B of handle 17.

Second end 19 of shaft 16 has anchoring recess 13 located in an opposite direction of chamber opening 26 of chamber 22. Anchoring recess 13 is configured to interlock with a rod holder of a boat (not shown).

Figures 11, 12:
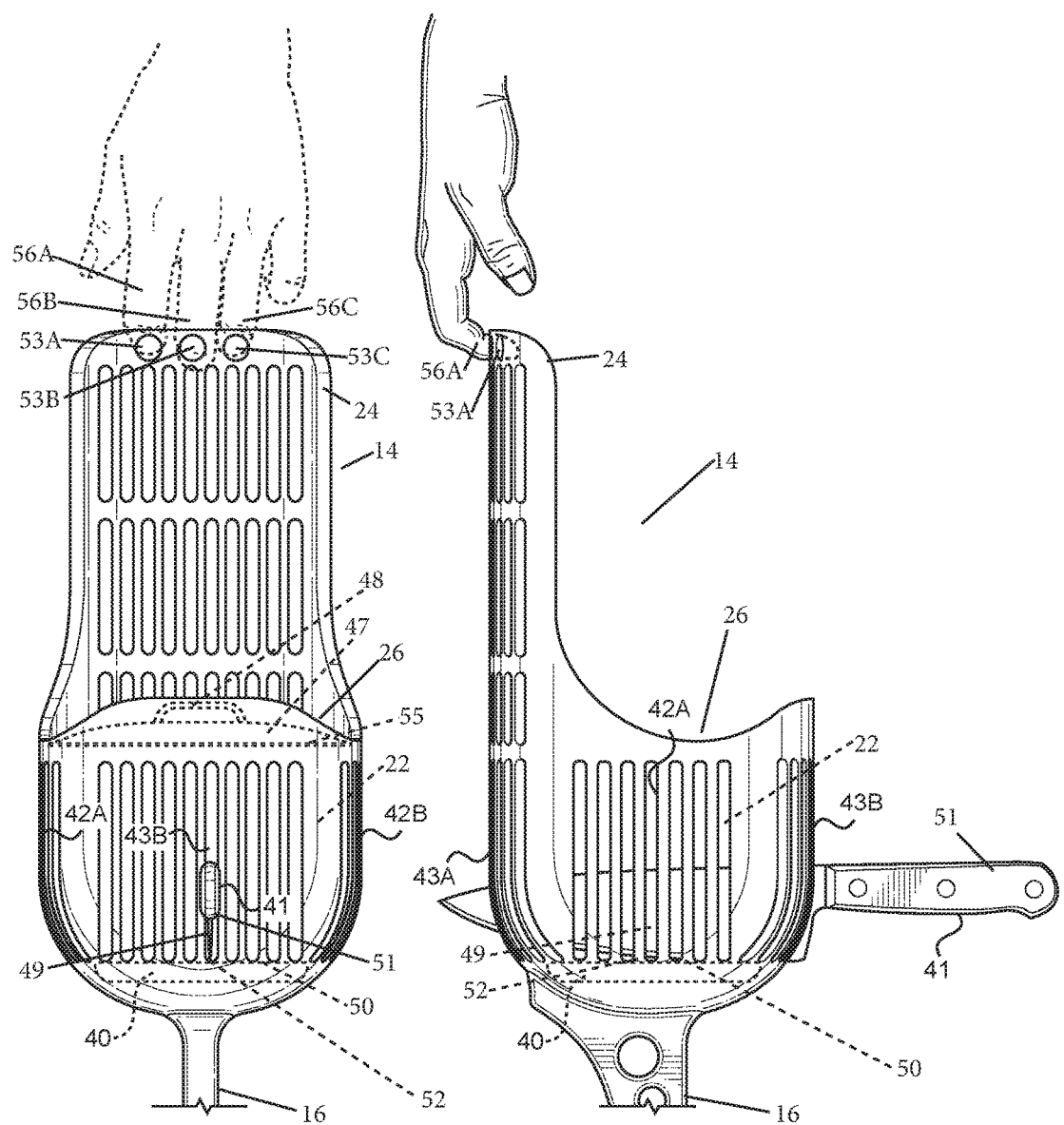
FIG. 11 is a front perspective view of an alternate embodiment of the novel chumming device having a cutting board connected to an inner surface of the chamber and having a second pair of opposing openings orienting the blade of a knife over the cutting board.
FIG. 12 is a side perspective view of an alternate embodiment of the novel chumming device having a cutting board connected to an inner surface of the chamber and having a second pair of opposing openings orienting the blade of a knife over the cutting board.

Chumming device 14 can have a removable bait press 47 (FIGS. 9 and 11). Removable bait press 47 has plate 55 and handle 48. In an example, the chamber 22 is filled with live bait such as fish as user grips handle 17 of shaft 16. Once the chamber 22 is filled with bait, the user's fingers can be inserted through finger openings 53A-53C. In an embodiment there is a single finger opening or there may be a plurality of finger openings 53. A user takes their other hand and grasps handle 48 of removable bait press 47. The removable bait press 47 is inserted through chamber opening 26 of chamber 22. The force of a user pressing plate 55 of removable bait press 47 against the live bait (not shown) helps to stabilize the live bait within chamber 22 between plate 55 and cutting board 40 while cutting.

The blade 49 of knife 41 is inserted through first pair of opposing openings 42A-42B (FIG. 9). When blade 49 of knife 41 is inserted through the first pair of opposing openings 42A-42B, the knife blade 49 is positioned and aligned directly over 52 cutting board 40. The force of a user pressing the blade 49 of knife 41 toward the cutting board 40 cuts through the live bait. The knife can then be inserted through second pair of opposing openings 43A-43B (FIG. 11) to cut through the live bait at a different angle. It is within the scope of this invention for novel chum device 14 to have a plurality of pairs of opposing openings. Once the bait press 47 is removed from the chamber 22, the chum can be dispensed or launched from the chamber 22. The bait press 47 is removable inserted and removed from chamber 22 through chamber opening 26.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

The invention claimed is:

1. A chumming device for bait, comprising:
a shaft, said shaft having a first end located opposite a second end, said shaft having a curvature;
a head, said head is connected to said first end of said shaft, said head having a plurality of openings, said plurality of openings are configured to allow water flow while scooping bait from a live well;
said head having a top portion, said top portion comprising a protruding structure configured to launch said bait from said head;
a chamber, said head having a lower portion, said lower portion of said head forming said chamber, said chamber having a chamber opening, said chamber opening having a size great enough to receive bait, said chamber is configured to retain said bait;
a cutting board, said lower portion of said chamber having the cutting board;
said plurality of openings comprising a first pair of opposing openings;
a knife, said knife having a handle located opposite a blade, said blade of said knife is oriented over said cutting board when said blade of said knife is received by said first pair of opposing openings;
said chamber having a first side wall located opposite a second side wall, said first side wall and said second side wall having said first pair of opposing openings, said first pair of opposing openings are oriented in alignment with each other and are configured to receive said blade of said knife when said blade of said knife is received by said first pair of opposing openings, said cutting board is located between said first pair of opposing openings, said first pair of opposing openings are configured to position said blade of said knife over said cutting board when said blade of said knife is received by said first pair of opposing openings;
said chamber having a lip located opposite said protruding structure, said protruding structure extending beyond said chamber, said protruding structure is configured to align said bait to be launched in a direction by a force of a user; and,
a handle, said handle is connected to said second end of said shaft.

2. The chumming device of claim 1, further comprising said plurality of openings comprising a second pair of opposing openings, said chamber having said second pair of opposing openings, said second pair of opposing openings are oriented in alignment with each other and are configured to receive said blade of said knife when said blade of said knife is received by said second pair of opposing openings, said cutting board is located between said second pair of opposing openings, said second pair of opposing openings are configured to position said blade of said knife over said cutting board when said blade of said knife is received by said second pair of opposing openings.

3. The chumming device of claim 1, further comprising said lower portion of said chamber having a recess, at least a portion of said cutting board is retained by said recess.

4. The chumming device of claim 3, further comprising said at least a portion of said cutting board protrudes from said recess.

5. The chumming device of claim 1, further comprising said top portion of said head having at least one opening configured to receive at least one finger of a user.

6. The chumming device of claim 1, further comprising said lower portion of said chamber having a substantially planar surface.

7. The chumming device of claim 1, further comprising said cutting board is integrally formed into said lower portion of said chamber.

8. The chumming device of claim 1, further comprising said cutting board is connected to said lower portion of said chamber.

9. The chumming device of claim 1, further comprising said plurality of openings are positioned in rows of vertically oriented slots.

10. The chumming device of claim 9, further comprising said vertically oriented slots are positioned parallel to each other.

11. The chumming device of claim 1, further comprising said handle having at least one finger groove.

12. The chumming device of claim 1, further comprising said first end of said shaft having a plurality of bores, said plurality of bores each have different sized diameters, said plurality of bores are arranged in an ascending diameter size from said first end of said shaft to said head, a first bore has a first diameter length, a second bore has a second diameter length, a third bore has a third diameter length, said first diameter length of said first bore is a length greater than said second diameter length of said second bore, said second diameter length of said second bore is a length greater than said third diameter length of said third bore.

13. The chumming device of claim 1, further comprising said shaft having a first shaft opening, a second shaft opening, and a third shaft opening traversing the length of said shaft, at least a portion of said first shaft opening overlays a portion of said second shaft opening, at least a portion of said third shaft opening overlays a portion of said second shaft opening.

14. The chumming device of claim 13, further comprising said second shaft opening having a recess positioned parallel to a first finger recess of said handle.

15. The chumming device of claim 13, further comprising said third shaft opening having a shape substantially contouring a second finger recess of said handle.

16. The chumming device of claim 1, further comprising said secondary end of said shaft having an anchoring recess located in an opposite direction of said chamber opening, said anchoring recess is configured to interlock with a rod holder.

17. The chumming device of claim 1, further comprising said shaft being made of a flexible material.

18. The chumming device of claim 1, further comprising said first side wall of said chamber having a first recess bordering said chamber opening and said second side wall of said chamber having a second recess bordering said chamber opening.

19. A chumming device for bait, comprising:
a shaft, said shaft having a first end located opposite a second end, said shaft having a curvature;
a head, said head is connected to said first end of said shaft, said head having a plurality of openings, said plurality of openings are configured to allow water flow while scooping bait from a live well;
said head having a top portion, said top portion comprising a protruding structure configured to launch said bait from said head;
a chamber, said head having a lower portion, said lower portion of said head forming said chamber, said chamber having a chamber opening, said chamber opening having a size great enough to receive bait, said chamber is configured to retain said bait;
a cutting board, said lower portion of said chamber having said cutting board;

said plurality of openings comprising a first pair of opposing openings;

said chamber having a first side wall located opposite a second side wall, said first side wall and said second side wall having said first pair of opposing openings, said first pair of opposing openings are oriented in alignment with each other and are configured to receive said blade of said knife when said blade of said knife is received by said first pair of opposing openings, said cutting board is located between said first pair of opposing openings, said first pair of opposing openings are configured to position said blade of said knife over said cutting board when said blade of said knife is received by said first pair of opposing openings;

said chamber having a lip located opposite said protruding structure, said protruding structure extending beyond said chamber, said protruding structure is configured to align said bait to be launched in a direction by a force of a user; and, a handle, said handle is connected to said second end of said shaft; and, a removable plate, said removable plate having a handle, said removable plate is configured to be retained by said chamber of said head.

* * * * *